(12) United States Patent
Bortolussi et al.

(10) Patent No.: US 11,744,191 B2
(45) Date of Patent: Sep. 5, 2023

(54) DEVICE FOR TENSIONING PLANT SUPPORT WIRES, SUPPORT SYSTEM OF SAID PLANTS COMPRISING SUCH DEVICE AND THE METHOD OF SUPPORT THEREOF

(71) Applicants: Franco Bortolussi, Fiume Veneto (IT); Claudio Bortolussi, Fiume Veneto (IT)

(72) Inventors: Franco Bortolussi, Fiume Veneto (IT); Claudio Bortolussi, Fiume Veneto (IT)

( * ) Notice: Subject to any disclaimer, the term of this patent is extended or adjusted under 35 U.S.C. 154(b) by 71 days.

(21) Appl. No.: 16/766,503

(22) PCT Filed: Nov. 20, 2018

(86) PCT No.: PCT/IB2018/059131
§ 371 (c)(1),
(2) Date: May 22, 2020

(87) PCT Pub. No.: WO2019/102347
PCT Pub. Date: May 31, 2019

(65) Prior Publication Data
US 2020/0375121 A1  Dec. 3, 2020

(30) Foreign Application Priority Data
Nov. 27, 2017 (IT) .......................... 102017000136095

(51) Int. Cl.
*A01G 9/12* (2006.01)
(52) U.S. Cl.
CPC .............. *A01G 9/126* (2013.01); *A01G 9/122* (2013.01)
(58) Field of Classification Search
CPC .. A01G 9/126; A01G 9/122; A01G 2017/065; Y10T 24/2158; Y10T 24/2187
See application file for complete search history.

(56) References Cited

U.S. PATENT DOCUMENTS 1,056,190 A * 3/1913 Lorenz .................... F16B 21/12
411/513
1,088,942 A * 3/1914 Swank .................. E04H 17/133
256/43
(Continued)

FOREIGN PATENT DOCUMENTS

AT     307794 B * 3/1972 .............. F16G 11/12
AT     307794 B * 6/1973
(Continued)

OTHER PUBLICATIONS

Feb. 18, 2019 International Search Report issued in International Patent Application No. PCT/IB2018/059131.
(Continued)

*Primary Examiner* — Monica L Perry
*Assistant Examiner* — Brittany A Lowery
(74) *Attorney, Agent, or Firm* — Oliff PLC (57) ABSTRACT

A device for the tensioning of wires supporting the vegetation of plants that includes at least one wire tensioning member, one support member adapted to support the tensioning member in rotation, and a blocking means to block the rotation of said tensioning member. The tensioning member includes a metal fork bent and the support member has at least one through-hole penetrated by the tensioning member so that said tensioning member rotates with respect to the support member. The means for blocking the rotation of the tensioning member include at least one recess or groove that reversibly engages with the tensioning member.

8 Claims, 7 Drawing Sheets

(56) References Cited

U.S. PATENT DOCUMENTS

| | | | | |
|---|---|---|---|---|
| 1,097,371 | A | * | 5/1914 | Stern ........................ F16B 21/12 411/513 |
| 1,512,951 | A | * | 10/1924 | Schaefer ................. F16B 21/12 411/516 |
| 1,986,586 | A | * | 1/1935 | Lovenston ............... F16B 21/12 411/360 |
| 2,451,389 | A | * | 10/1948 | Howe ...................... F16G 11/12 254/222 |
| 2,631,487 | A | * | 3/1953 | MaClean, Jr. ........... F16B 21/12 411/513 |
| 3,791,623 | A | * | 2/1974 | Bozik ...................... F16G 11/12 248/499 |
| 3,811,655 | A | * | 5/1974 | Foster ...................... B60P 7/083 24/68 CD |
| 4,040,602 | A | * | 8/1977 | Foster, Sr. ............... F16B 21/12 403/243 |
| 4,620,389 | A | * | 11/1986 | Coulson ................. A01G 17/06 47/46 |

FOREIGN PATENT DOCUMENTS

| | | | | |
|---|---|---|---|---|
| AT | 307794 B | | 6/1973 | |
| EP | 1699286 B1 | | 10/2008 | |
| EP | 2324700 A1 | | 5/2011 | |
| FR | 2626058 A1 | * | 1/1988 | |
| FR | 2996791 A1 | * | 4/2014 | ........... E04H 17/266 |
| GB | 2112093 A | * | 7/1983 | .............. F16G 11/12 |

OTHER PUBLICATIONS

Feb. 18, 2019 Written Opinion of Searching Authority issued in International Patent Application No. PCT/IB2018/059131.

* cited by examiner

DEVICE FOR TENSIONING PLANT SUPPORT WIRES, SUPPORT SYSTEM OF SAID PLANTS COMPRISING SUCH DEVICE AND THE METHOD OF SUPPORT THEREOF

SECTOR OF THE INVENTION

The present invention refers to a device for the tensioning of wires supporting the vegetation of plants, preferably orchards and especially vineyards. In particular, the invention is related to a simplified and easy-to-use device for tensioning said wires in a support system of rows of plants for the management and organization of the vegetation. The invention also relates to a method for supporting plants in rows.

PRIOR ART OF THE INVENTION

In agriculture, and in particular in the field of viticulture, it is well known to provide support structures for plants consisting of series of poles embedded in the ground to form rows. The poles are spaced from each other and interconnected in their parts protruding from the ground by a horizontal wire, called a "carrying wire", which is fastened on said poles at an appropriate height from the surface of the ground. On two poles at the end of each row, called "head poles", at least one pair of parallel wires are also fastened, as well as arranged on respective sides of each pole of the same row. These wires are commonly called "containment wires" or "movable wires" because, during the various stages of plant cultivation, they are moved to different heights from the ground to contain and organize the growing vegetation according to a desired configuration. In the winter season, in effect, when the grapevine shoots have very short lengths or are completely absent, the pairs of movable wires are arranged in a position close to the ground. In the spring and summer seasons when the plants produce increasingly lush vegetation, each pair of movable wires is placed in a position progressively further away from the ground according to the direction orthogonal to the ground, harnessing the vegetation between the wires of each pair, thus organizing its development according to a desired configuration. This operation is commonly carried out to ensure greater exposure of the leaf surface and the fruits of the plants to the sun and wind. Moreover, in this way, operations for caring for the vegetation, such as pruning, phytotreatments and other completely conventional operations, are facilitated.

It is apparent that both the carrying wire and the movable wires must be fastened to the ends of the rows and tensioned to perform their function correctly. In this regard, different tensioning devices have been on the market for several years now.

The most common of these are represented by a tensioning roller consisting of a rectilinear metal bar, usually cylindrical or hexagonal, comprising at least one end shaped so as to be engaged by a tool such as a hexagonal head wrench, and a through-hole near one of its two ends which is engageable by a pin blocking the undesired rotation of the same roller once the carrying wire or the movable wires have been tensioned. An additional central through-hole is required for engaging and winding the wire. The roller is inserted between two through-holes made on opposite walls of a head pole to tension said wires or is mounted in a resilient compensating device for the containment wires, as, for example, shown in European patent EP1699286.

Further devices consist of a throttle block equipped with a solid body provided with at least one inner channel suitable for sliding a wire in communication with a ramp cavity suitable to house a device for selectively blocking the sliding of said wires in one direction only, while allowing sliding in the opposite direction. The blocking device is, for example, a spring that acts on a ball member to interact with the wire. Such device is, for example, described in the patent application WO2016/102907.

Another device has a body consisting of a hollow member with a tapered outer surface and a donut-shaped head fixed to the body, for example, by means of welding or molding and pressing, and slightly protruding therefrom in a radial direction. Inside the tapered body, near the opening of the narrowest side of the same, there are retaining means, such as wedge-shaped members, which protrude from the inner edges of the body toward the center of the cavity, partially closing it. Said retaining means are associated with one end of a contrast member consisting of a spring operating by compression which, at the other end, abuts against the inner surface of the head. The pressure exerted by the wire at the entry of the body between the retaining means causes the spring associated therewith to compress and therefore allows the insertion of the wire into the blocking member. Once the pressure exerted by the force of inserting the wire into the blocking member has ceased, i.e. when the desired degree of wire tensioning has been reached, the contrast spring pushes the retaining means toward their resting position so that they wedge between the inner surface of the body and the wire, preventing the latter from slipping out. In other words, the blocking member is internally configured to allow the passage therein of a wire only in one direction, preventing, through appropriate retaining means, the possibility that the wire slips out in the opposite direction, in a manner similar to what happens with the device described in WO2016/102907.

All the devices known and briefly described above, although effective in their operation, are more or less structurally complex and, therefore, require special machining in their production, which obviously has an impact on the relevant costs. In effect, even the simplest device represented by the roller still requires machines for the pressing and machining of a rod or metal billet to obtain an end that is engageable by a rotation tool, as well as to obtain an engagement hole for the retainer.

As far as the block and the throttle cone are concerned, there is a further drawback imposed by the fact that the respective inner mechanism may encounter malfunctions caused by the entry of grains of dust, stones or earth that block the correct functioning of the spring. Moreover, even to activate the block, a specific tool is envisaged consisting of a sort of pliers with large arms, a support end for the block and a gripping end for the wire, the latter being operable so as to pull the end of the wire in the tensioning direction.

SUMMARY OF THE INVENTION

The task of the present invention is therefore to provide a tensioning device for wires, in particular for carrying wires and movable wires supporting grapevine shoots or plant branches, which overcomes the defects and drawbacks of devices of a known type such as those described above.

In the context of the task described above, an object of the present invention is therefore to provide a wire tensioning device that is simple and quick to install on a pole of a row of plants or on a resilient compensating device that is easy to operate and economical to produce.

Another object of the present invention is to create a tensioning device for wires that may be mounted on any type of pole for rows of plants regardless of the shape and size of the cross-section of the pole.

A further object of the present invention is to create a tensioning device for wires the overall dimensions of which do not substantially alter the overall dimensions of the members on which it is mounted, so as not to hinder the processing operations, especially the mechanized ones along the rows.

A still further object of the present invention is to create a tensioning device for wires, in particular for movable wires to support the grapevine shoots or plant branches, which is substantially free of malfunctions.

Other objects are a system for supporting plants in rows and a method for supporting plants in rows comprising such device.

BRIEF DESCRIPTION OF THE FIGURES

The above-described task and objects are achieved by a tensioning device having the features set out in the accompanying claims. Further features and advantages of the invention will become apparent from the description that follows, provided by way of non-limiting example with reference to the accompanying drawings, wherein:

DETAILED DESCRIPTION OF THE INVENTION

Figure 1:
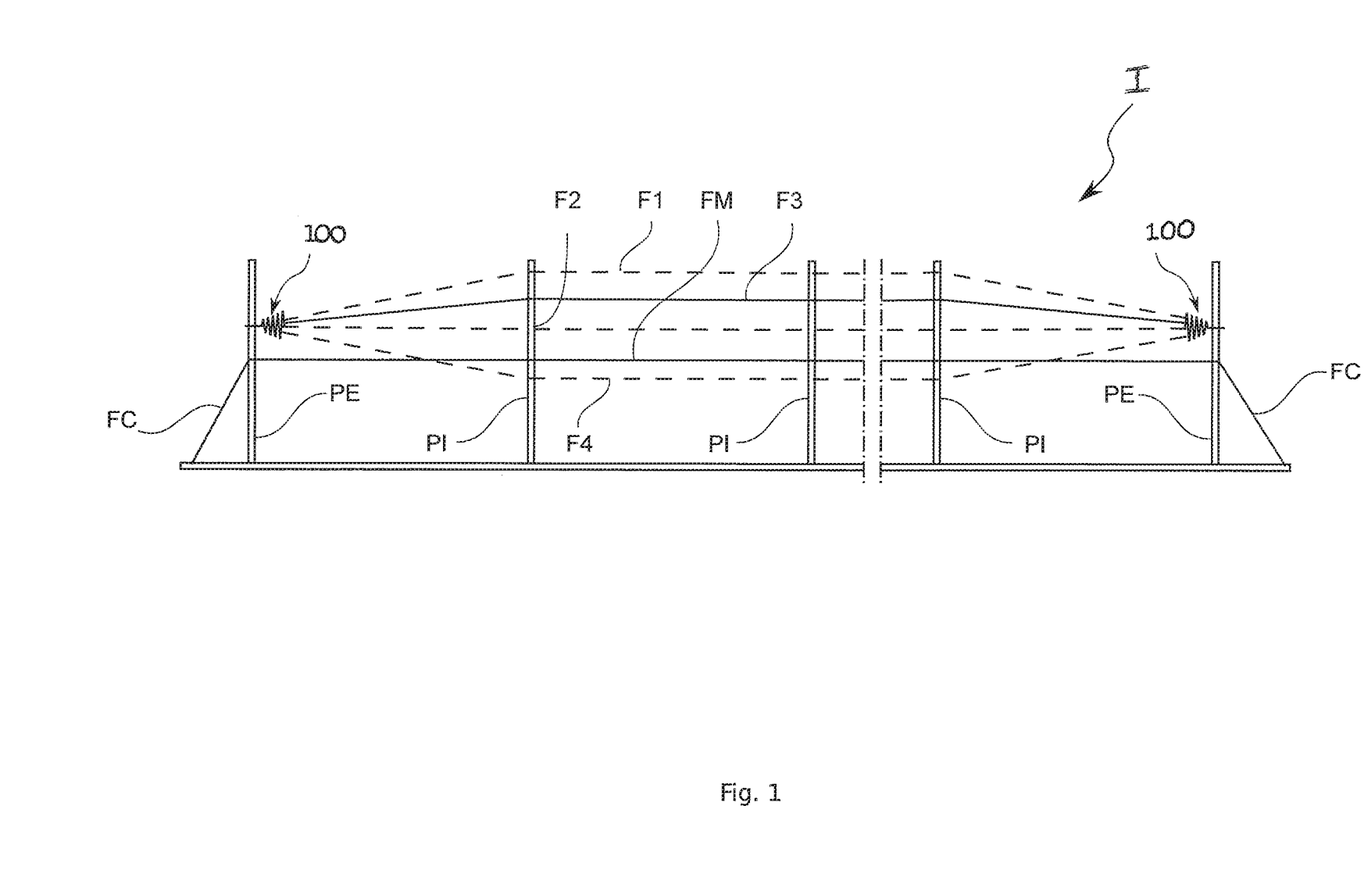
FIG. 1 shows a schematic view of a system for supporting a row of grapevines.
Figure 2:
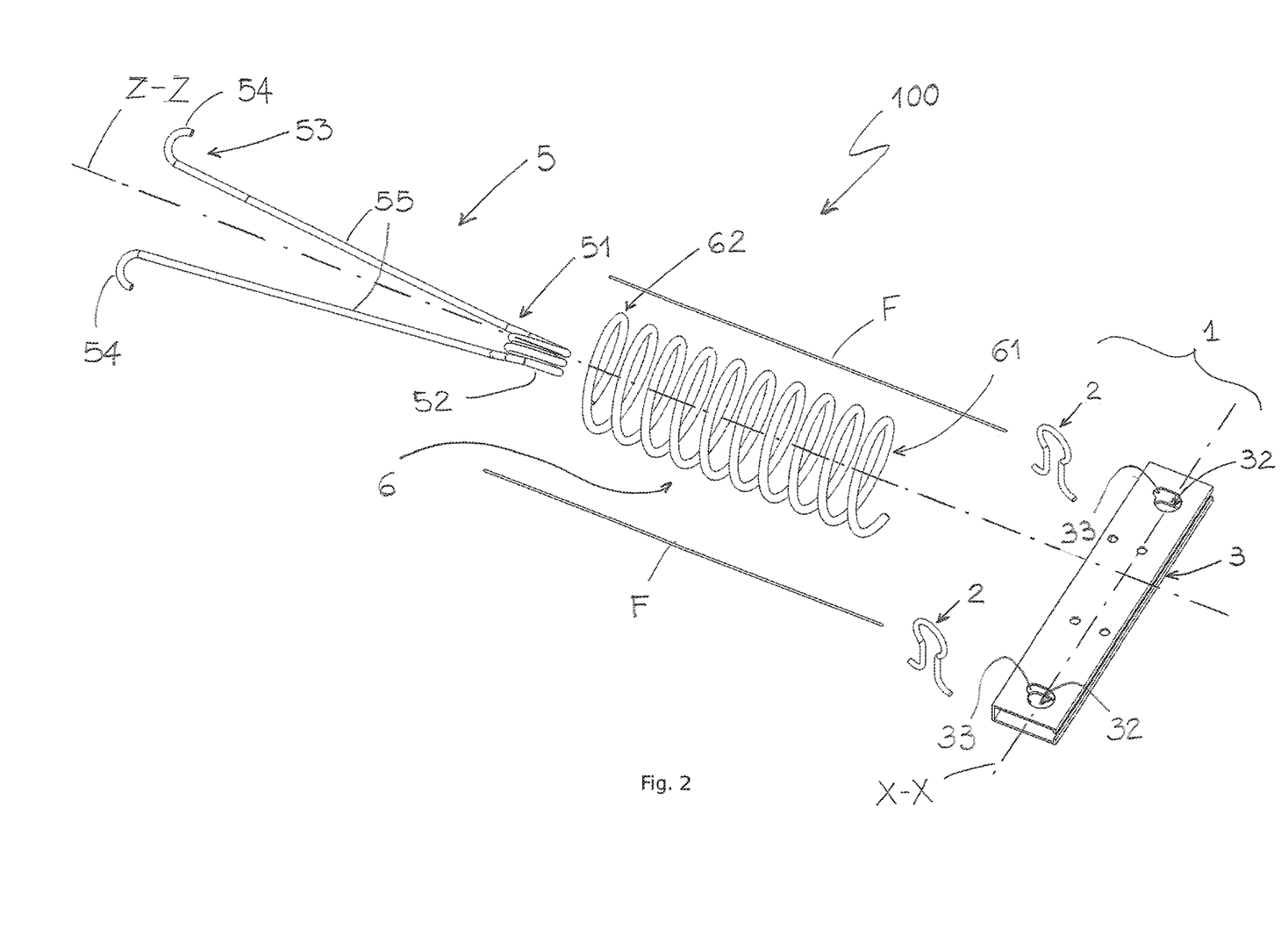
FIG. 2 shows an axonometric and exploded view of a resilient compensating device comprising the tensioning device according to the invention in a first embodiment.

FIG. 2 shows an exploded view of a resilient compensating device 100 for a pair of wires F for containing vegetation. This type of device is used in a system I for supporting plants in a row. Usually, the system (FIG. 1) is composed of a plurality of poles arranged aligned and spaced apart from each other. The poles, as is known, may consist of suitable members made of wood, concrete or even metal or plastic, with cross-sections of different shapes and often provided with members and/or devices for the attachment, even reversible, of metal wires thereon. The poles at the ends of the row, called "head poles" or "end poles", are indicated at the reference PE and the intermediate poles at the reference PI. A fixed wire FM called a "carrying wire" is attached to all the poles PE and PI at a suitable height above the ground; moreover, the head poles are appropriately braced by suitable bracing wires indicated at the reference FC. On the two head poles PE are also provided resilient compensating devices 100 placed at a suitable distance from the ground; in the example shown in FIG. 1, the resilient compensating devices 100 are arranged in a position higher than the fastening devices of the carrying wire FM. Each resilient compensating device 100 is associated with a pair of movable wires F which are provided on both sides of the intermediate poles PI, i.e. on both sides defined by the system. Due to the resilience of the compensation devices 100, the movable wires F may be fastened with simple coupling maneuvers to suitable coupling members, in themselves conventional, obtained or applied on the relevant intermediate poles PI so as to be positioned at different heights from the ground. In order to highlight the different possible positions of the movable wires F, a numeric symbol has been added to the common reference F. Moreover, only the position of the wire F3 is indicated with a continuous line, while the others, namely the positions of the two lower movable wires and that of the wire above the wire F3, are indicated with dashed lines and respectively with the references F1, F2 and F4. The movable wires are also called containment wires for the growing vegetation because, in the space defined therebetween, the vegetation is contained and supported during growth. Alternatively, for each resilient compensating device, a single wire to be tensioned may be associated to make the single wires movable independently from each other.

Figure 3:
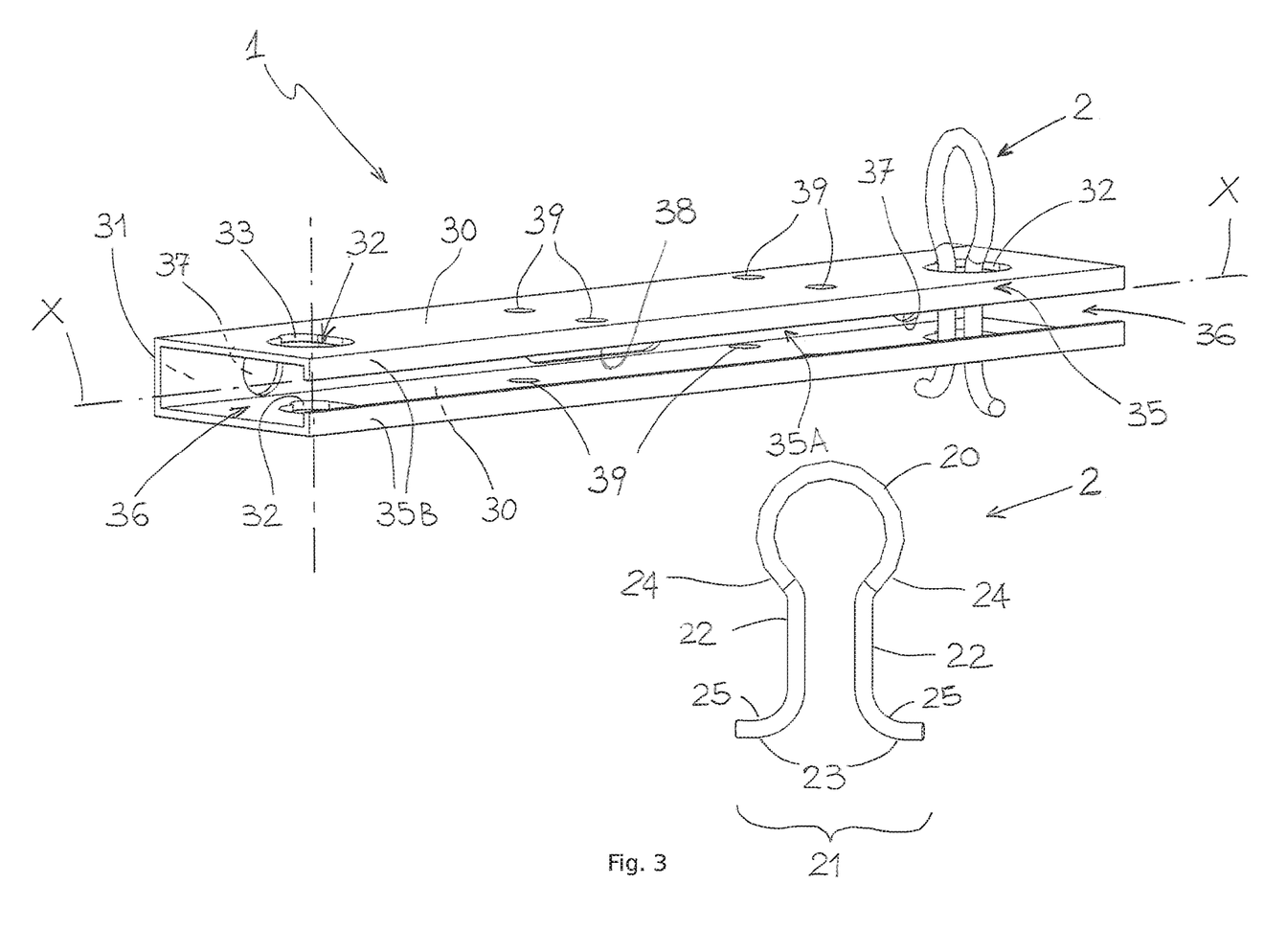
FIG. 3 shows an axonometric view of a detail of the tensioning device in FIG. 2.
Figure 4:
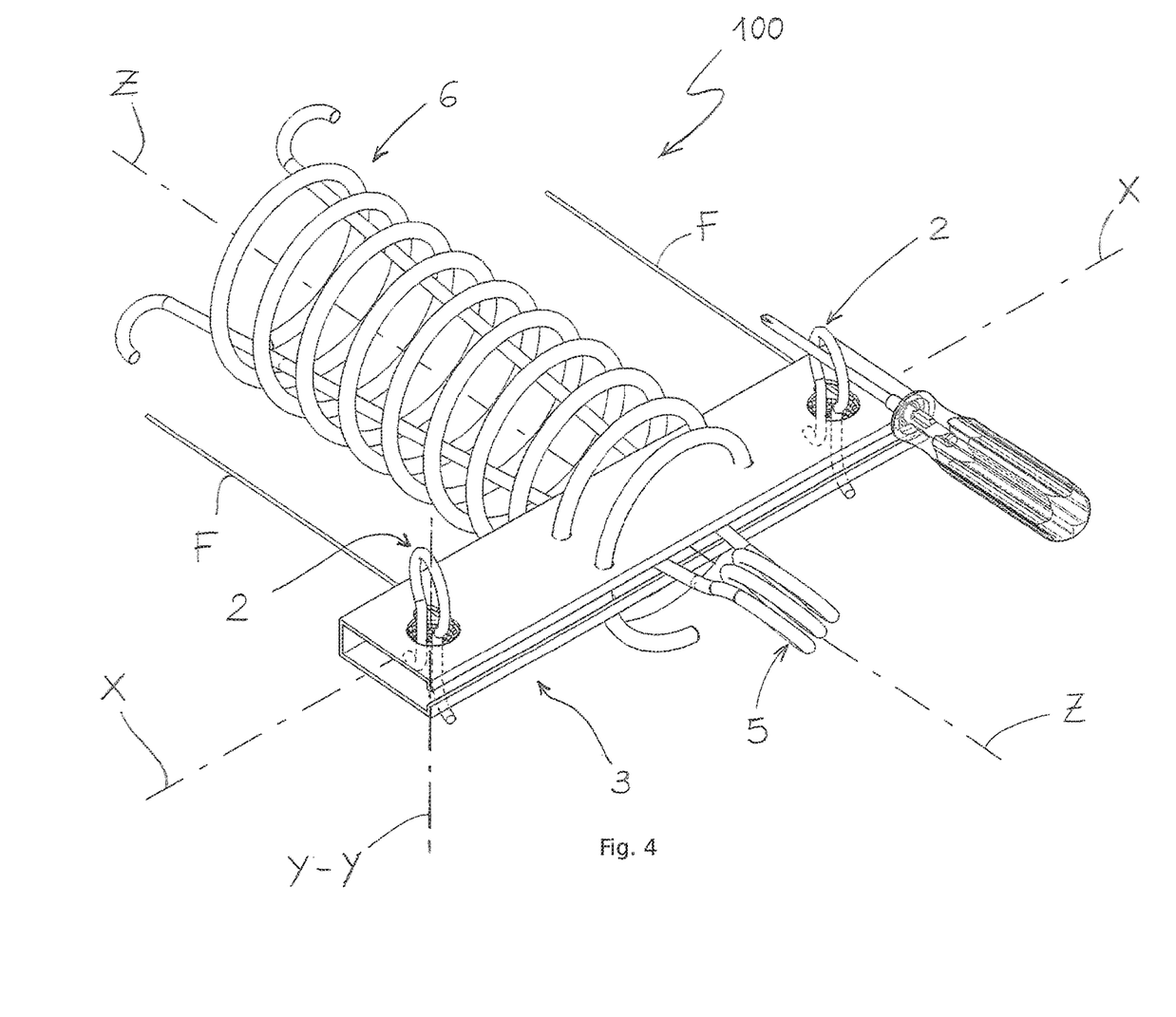
FIG. 4 shows an axonometric view of the resilient compensating device in FIG. 2 in the operating condition.

With reference to FIGS. 2-4, a device 1 for tensioning the wires F is now described, mounted, for example, on a resilient compensating device 100.

The tensioning device 1 comprises at least one tensioning member 2 of a wire F and a corresponding support member 3 adapted to support the same tensioning member in rotation.

Advantageously, at least one tensioning member 2, as better represented in FIG. 3, consists of a fork comprising a first bridge end 20 connected in one piece to a second end 21 by means of two arms 22. The second end consists of the two free ends 23 of the fork. The first end 20 is engageable by a tool to rotate the tensioning member, while the arms 22 are intended to engage a hole in the support member 3 in a position of free rotation or in a position of blocked rotation. Preferably, the fork 2 is made from a rod or bar of metal bent to define a general U shape. More preferably, the ends 23 are bent so as to have a divergent or convergent progression between them.

In accordance with a first embodiment of the tensioning member, the first end 20 is ring-shaped and joins at the arms 22 by means of an undercut 24 adapted to engage a hole of the support member 3 in a position of free rotation or in a position of blocked rotation, as explained below. Moreover, the first end is intended to engage with a tool (FIG. 4) to operate the rotation of the device 1 in the winding of a wire F to be tensioned thereon. Preferably, the annular shape has a greater diameter with respect to the engagement hole in the support member 3 to prevent the tensioning member from exceeding said hole by disengaging from the same support member.

According to a specific embodiment of the invention, the ring of said first end 20 preferably has an open circular shape. On the other hand, the two arms 22 extending from the ends of the ring are substantially rectilinear and parallel, and end with the two ends 23 of the rod bent back in a divergent direction. Therefore, the general shape of the tensioning member 2 in this embodiment is an omega (Ω).

As shown specifically in FIGS. 3 and 4, the arms 22 engage the support member 3 in rotation, while the bent ends 23 prevents the tensioning member 2 from slipping out of the same support member on the side opposite to the ring 20. Moreover, said ends are connected to the respective arm by means of a curve 25 to engage with a hole in the support member 3, as explained hereinafter.

In general, the support member 3 (FIGS. 2 and 3) comprises two opposing first walls 30, parallel and spaced from each other so as to define an empty space. The two first walls extend along a longitudinal axis X-X and are kept parallel to each other and spaced by a second wall 31 that joins a longitudinal edge of the same two first walls.

Advantageously, said two first walls 30 each comprise at least one through-hole 32 so that the hole in one of the first walls is aligned with the hole in the other first wall. Preferably, there are two holes 32, made near the longitudinal ends of the first walls. Said holes 32 will have an axis Y-Y substantially orthogonal to the longitudinal axis X-X of the first walls 30 (FIG. 3). Alternatively, each first wall has only one central hole 32. In any case, the holes 32 are engaged, as explained, by the arms 22 of the rotating tensioning member 2. In other words, the tensioning member rotates with respect to the support member, which, on the other hand, remains stationary.

In particular, according to the present invention, the support member 3 comprises means for blocking the rotation of the tensioning member 2.

In accordance with a first embodiment, the blocking means consist of at least one cam profile 33 (better shown in FIG. 2) of the through-holes 32 of the first walls 30 of said support 3. More specifically, the through-holes 30 show a contour comprising a circular portion and a portion with at least one cam profile 33. At least one cam profile constitutes a sort of seat or recess in which the straight arms 22 of the fork 2, or preferably one of the two undercuts 24 on one side and one of the two curves 25 on the other, are accommodated so as to block the rotation of the member on the axis Y-Y, as explained below.

According to a preferred embodiment of the invention, the support member 3 of the tensioning member 2 of the tensioning device 1 constitutes a fastening member of the wires F to be tensioned with a resilient compensating device 100.

Such a resilient compensating device is described in the international patent application PCT/IT 2017/000181, therefore it will not be detailed here. In general, the resilient compensating device 100 in FIGS. 2, 4 and 5, comprises a fastening member 5 for the device 100 to a head pole PE of a row, a support member 3 of the wire F tensioning members 2 and a compensating resilient member 6 for the wires F.

The member 5 for fastening to the pole PE extends in a straight line along an axis Z-Z between a first end 51 provided with at least one slot 52 and a second end 53 opposite to the first end 51 and provided with two opposite hooks 54. Alternatively, the slot may be a single or double ring that wraps directly around an end pole PE. The two ends are connected in one piece by means of elongated portions 55.

The resilient member 6 preferably consists of a helical compression spring extending longitudinally from the first end 61 and the second end 62. Said spring is fitted to said fastening member 5 in such a way that the first end 61 is positioned near the first end 51 of said fastening member 5, while the second end 62 is positioned near the second end 53 of said fastening member. In particular, it should be noted that at least the last winding of the second end 62 of the spring is hooked by the aforementioned two hooks 54 of the fastening member. Therefore, in this position, the spring practically encircles the two elongated portions 55 along their entire length.

In a first embodiment, the support member 3 (FIG. 3) consists of a block or bar, preferably in a generally parallelepipedal shape, which extends along the longitudinal axis X-X described above. The block 3 advantageously consists of a sheet bent onto itself so as to define an inner cavity through the aforesaid two opposite first walls 30, said second wall 31 substantially closed opposite a third wall 35 provided with a longitudinal opening 35A delimited by the edges 35B of the sheet that face each other after the aforesaid bending. In this configuration, the block 3 preferably shows two openings 36 lying on the axis X-X, i.e. orthogonal to the aforesaid first walls 30. Moreover, near each of said openings 36 and on said second wall 31 there is made at least one through-hole 37 for engaging with one or more wires F, while a slot 38 for engaging with the aforesaid elongated portions 55 of the first fastening member 5 is obtained centrally with respect to said third wall 35. On the other hand, on each of said first walls 30 there is at least one pair of through-holes 39 for engagement with at least one coil of the spring 6.

In the aforesaid configuration, the support member 3 is always arranged transversely with respect to the predominant extension of the fastening member 5, i.e. along an axis Z-Z, and is moreover slidingly mounted on the elongated portions 55 of said fastening member by means of the engagement on one side with the longitudinal opening 35A of the third wall 35 and on the other side with the slot 38 of the second wall 31 of the block 3.

With regard to the operation of the resilient compensating device 100 comprising the tensioning device 1 of the wires F of the invention, one may refer to that which is described in the patent application PCT/IT2017/000181, as there are no differences, apart from the tensioning device which comprises known and critiqued devices in the introductory part of the present description.

Consequently, all the advantages of such a resilient compensating device are also included when the tensioning device is applied according to the present invention. In other words, such advantages are added to those resulting from the use of the tensioning device described above.

The assembly and commissioning of the tensioning device of the invention is also particularly easy due to the constructive simplicity of the same device.

In effect, once the support member or sheet 3, bent as described above, has been provided, it is sufficient to take a fork-type tensioning member 2 and insert it into the support member so as to pass simultaneously through the two opposing holes 32 and letting the first end 20 protrude on one side and the second ends 23 on the other side of the support member. Preferably, the insertion may take place after having forced the first end through the two holes by means of the guide created by the rounded profile. Due to the resilient reaction of the fork, the arms 23 abut against the contour of the holes 32.

In the case wherein the second free ends 23 are bent to be divergent and the first end 20 is ring-shaped with undercuts 24, the first end is forced into the hole 32 of one of the two first walls 30 of the support member 3 and then into the hole 32 of the other of the two first walls 30 until it extends beyond the latter, obtaining a resilient snap engagement of the undercuts 24 with the respective edge of the hole. In this way, the first end is prevented from retracting. At the same time, the bent ends 23 covering a greater distance than the diameter of the hole 32, prevent the tensioning member from slipping from the support member towards the first end 20. The tensioning device is now ready for operation.

In particular, a wire F to be tensioned is first inserted into the hole 37 of the second wall 31 of the support member 3 until it is positioned between the arms 22 of the tensioning member 2. At this point, a very simple tool consisting of a rectilinear bar or a screwdriver, as shown in FIG. 4, is inserted in the first end 20 and is rotated around the axis of rotation Y-Y of the same tensioning member. Thus, the tensioning member 2 is free to rotate with respect to the support member 3, which instead remains stationary.

When the desired tension of the wire F is reached, one of the two arms 22, or one of the undercuts 24, is pulled to engage the cam contour 33 of the corresponding hole 32, thus blocking the rotation of the device. Similarly, one of the two free ends 23, or the curved section of the free ends when bent, is pulled to engage with the cam contour 33 of the corresponding hole 32, stabilizing the blocked rotation.

If one wishes to re-tension the wire F because over time it tends to become slack, it is sufficient to use the aforesaid simple tool to turn in the direction of screwing until the arms 22, or the undercuts 24 and the curves 25 are once again positioned in engagement with a cam contour 33. In practice, the contour of the hole 32 is made so as to allow the wire to be easily wound in one direction of rotation of the tensioning member, while blocking the unwinding of the wire in the wire's unwinding direction. In other words, the rotation of the tensioning member in the direction of winding is facilitated by the profile of the hole, while the rotation in the unwinding direction is blocked. In any case, if one wishes to loosen the wire tension, one would need to force the unwinding until the cam profile is surpassed.

Figure 5:
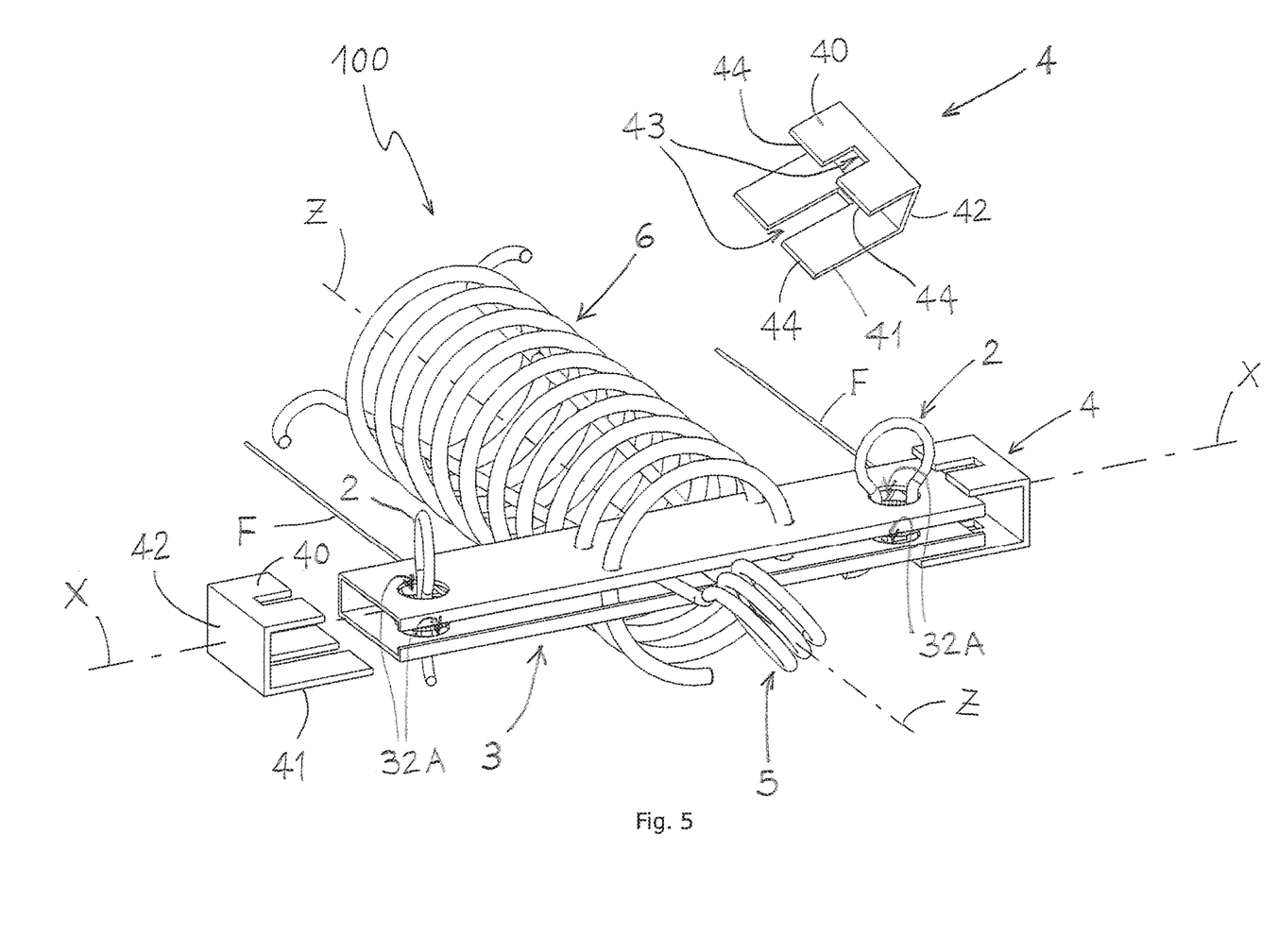
FIG. 5 shows a partially axonometric and exploded view of a resilient compensating device comprising the tensioning device according to the invention in a second embodiment.

In accordance with a variant embodiment of the invention, as shown in FIG. 5, the means of blocking the rotation of the tensioning member 2 are made up of a double fork retainer 4 to be fitted on the support member 3 on the tensioning members. In particular, the double fork retainer consists of a plate bent in a C-shape with a first portion 40 connected in one piece to a second portion 41 opposite and parallel to the first by means of a joint portion 42. The first and second portions are crossed by a groove 43 in order to create two forks 44 that extend in the direction of extension of the plate.

In addition, the support member 3 is similar to the support member described above and differs from it only in that it has through-holes 32A similar to the through-holes 32 described above, but without a cam profile. In other words, the through-holes 32A of the support member 3 each have a regular or continuous curvilinear contour, preferably circular or oblong; conversely, the hole 32 described above has an irregular or discontinuous curvilinear contour.

It follows that the locking of the rotation of the tensioning member 2, identical to that described above, is not achieved by engagement with a cam portion of the hole profile made on the support member, but rather is achieved with a retainer or shaped plate that fits on the support member easily and quickly when the desired degree of tensioning of the wire F has been reached. Therefore, the tensioning device of the invention comprises the tensioning member 2 as described above, a support member 3 of said tensioning member provided with holes 32A with a regular circular or oblong profile for engagement with said tensioning member and a blocking means 4 consisting of a grooved retainer.

In a further embodiment of the invention, the tensioning device 10 comprises a support member of the tensioning member consisting of a pole 7, or a portion thereof, for fastening the wires F.

Said pole 7 may be any of the above concrete poles described by way of example, possibly reinforced with iron, plastic or metal rods with open or closed shapes of various cylindrical, rectangular, T, triangular or irregularly shaped cross-sections. Preferably, plastics are reinforced with mineral fillers and/or glass or carbon fibers, PREPREG; while metal poles are made of stainless steel, galvanized steel, CORTEN, or conventional metal alloys. Generally, the pole 7 is a head pole PE, but it may also be an intermediate pole PI or an additional pole associated with the head pole, such as the pole PA described in patent EP2988589.

Figures 6A, 6B:
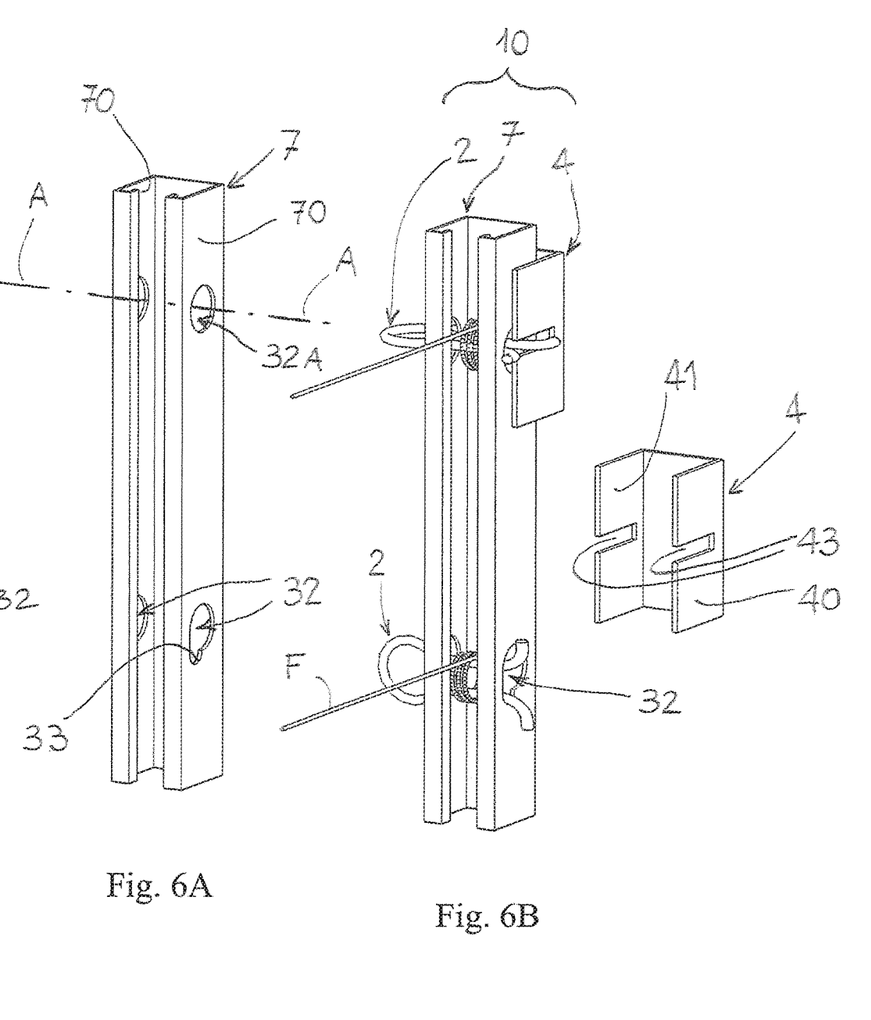
FIG. 6A shows an axonometric view of a vineyard pole according to the invention.
FIG. 6B shows an axonometric view of the pole of FIG. 6A with the tensioning device of the invention, in accordance with a first variant embodiment.
Figure 6C:
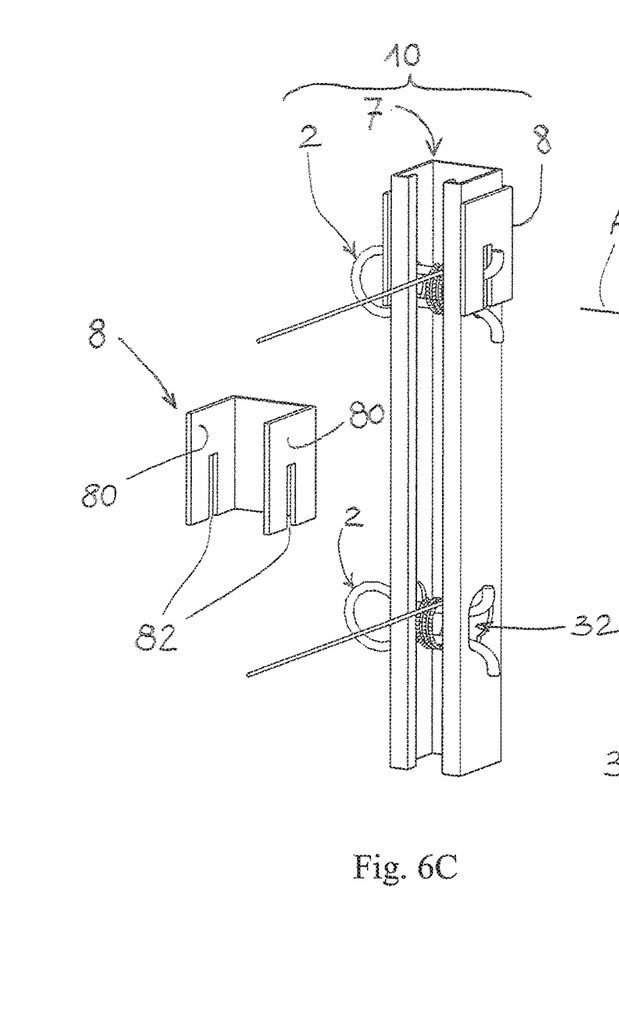
FIG. 6C shows an axonometric view of the pole of FIG. 6A with the tensioning device of the invention, in accordance with a second variant embodiment.
Figures 7A, 7B:
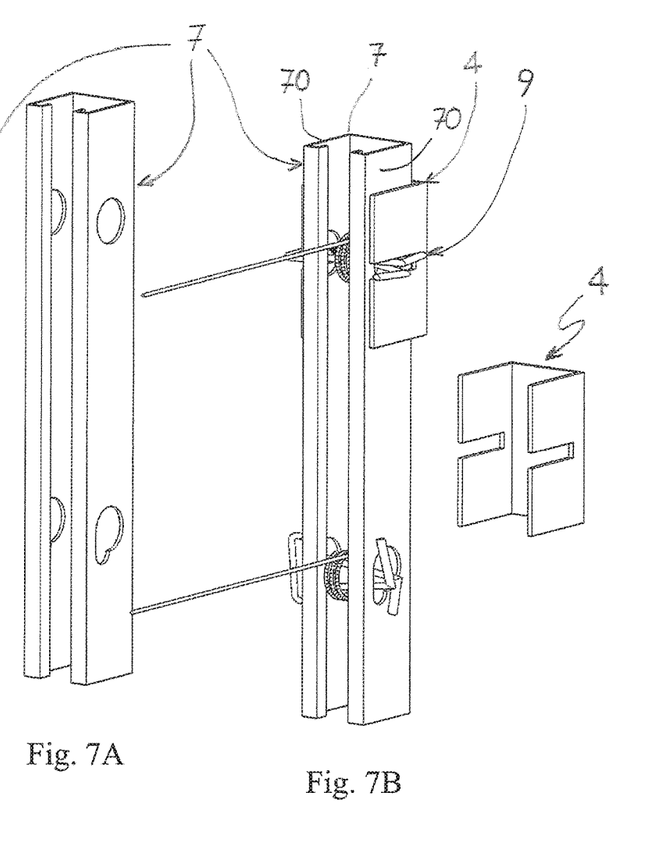
FIG. 7A shows an axonometric view of a vineyard pole according to the invention.
FIG. 7B shows an axonometric view of the pole of FIG. 7A with the tensioning device of the invention, in accordance with a third variant embodiment.
Figures 7C, 8:
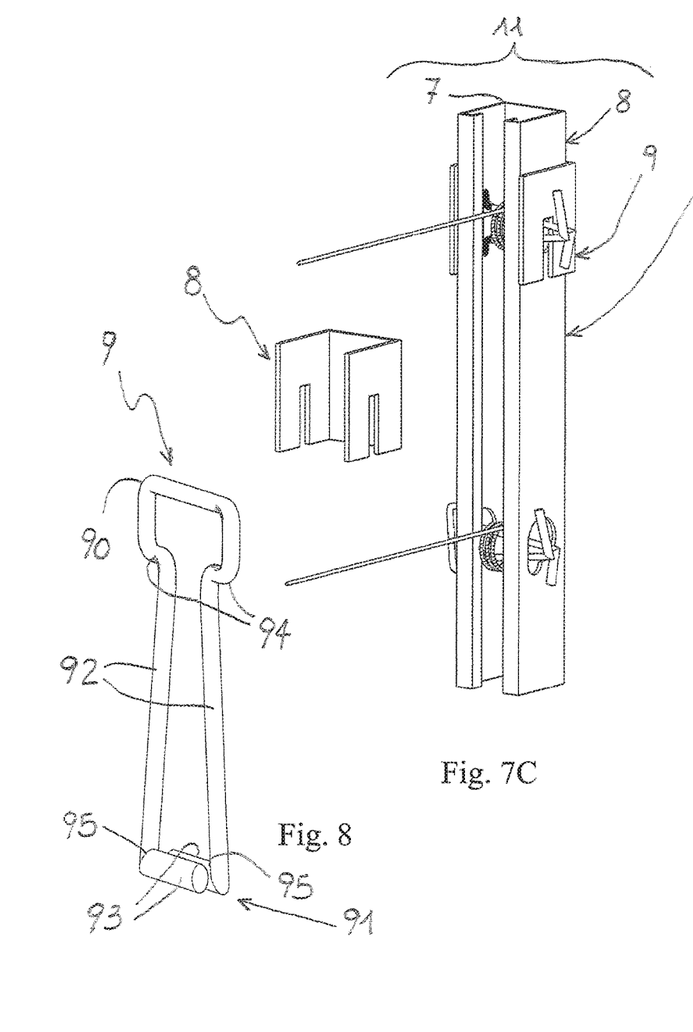
FIG. 7C shows an axonometric view of the pole of FIG. 7A with the tensioning device of the invention, in accordance with a fourth variant embodiment.
FIG. 8 shows an axonometric view of a tensioning member of the tensioning device of the invention, in accordance with a variant of the invention.

FIGS. 6 and 7 show poles with an open profile, with a general C-shaped cross-section wherein the ends of the C are preferably bent towards the inside of the pole.

In particular, the pole 7 comprises two substantially closed and opposing first walls 70 with rectilinear and parallel extension. Along these two walls there is obtained a plurality of through-holes having a common axis A-A orthogonal to the longitudinal extension of the first walls. These through-holes are distributed along the walls at predetermined distances according to standards, needs or preferences. In any case, the holes 32, 32A may have either a cam contour 33 or a regular contour as described above. In accordance with one embodiment, both types of holes 32 and 32A described above may be provided on a same pole 7.

It should be noted that the tensioning member 2 associated with the pole 7 will be identical to the tensioning member shown above and thus will not be described here again. Moreover, in the case wherein this member is inserted into the holes 32 shaped with a cam profile 33, as shown in the lower portion of the pole 7 of the FIGS. 6B and 6C, the operation and the assembly of the same member will be identical to that already described with reference to FIGS. 2-4 and therefore will not be repeated here.

Alternatively, as shown in the upper portion of FIG. 6B, when the tensioning member 2 engages a through-hole 32A of the pole 7 without the cam profile, i.e. a hole with a regular profile, it may be blocked using a blocking means substantially identical to that described above with reference to the grooved retainer 4. In particular, the blocking or retaining means 4 is fitted to the pole 7 on the side opposite to the open side of the pole so that the two parallel portions 40 and 41 each embrace one of the two first opposing walls 70 of the same pole until the two grooves 43 engage, one with the ring 20 and the other with the ends 23 of the tensioning member 2, blocking its rotation on the axis A-A.

According to a variant embodiment, as shown in FIG. 6C, the retainer 8 is similar to the retainer 4 described above with the only difference being that the grooves 82 are obtained on the two opposing walls 80 of the plate bent in a C which constitutes the retainer in the direction orthogonal to the extension of the same plate.

In this configuration, the retainer 8 is fitted to the pole 7 always on the closed side thereof opposite to the open one but at a certain distance from the tensioning member 2. Subsequently, the retainer is made to slide on the pole until the grooves engage, as before, one the ring 20 and the other on the ends 23 of the tensioning member 2 to block its rotation on the pole around the axis A-A.

In accordance with a further variant embodiment, as shown in FIGS. 7A-7C, the pole 7, i.e. the support member of the wire F tensioning device 11 according to the invention, is identical to the pole 7 described above, comprising the corresponding holes 32 and 32A. The blocking means 4 and 8 are also identical.

The tensioning member 9 (FIG. 8) consists of a metal rod bent so as to comprise a first ring end 90 connected in one piece to a second end 91 by means of two arms 92. The second end consists of the two free ends 93 of the rod that are bent so as to have a profile that is convergent therebetween.

The first ring end 90 is joined to the arms 92 by means of an undercut 94 adapted to engage a hole of the pole 7 in a position of free rotation or in a position of blocked rotation. Moreover, said first end is intended for engagement with a tool, such as, for example, the one shown in FIG. 4, to cause the rotation of the device 1 in the winding of a wire F to be tensioned thereon. It should also be noted that the annular shape has a greater diameter with respect to the engagement hole in the pole 7 to prevent the tensioning member from surpassing said hole and disengaging from the same support member.

In particular, the ring of said first end 90 has a rectangular shape, but it may also be circular. The two arms 92, on the other hand, extend from said first end 90, substantially rectilinear and parallel or slightly spaced apart, and end with the two ends 93 of the rod preferably bent in convergent direction so as to overlap.

As shown specifically in FIGS. 7B and 7C, the arms 92 engage the pole 7 in rotation in the respective holes 32 or 32A and, with the winding of the wire F, are brought closer together. As a result, the bent ends 93 tend to move away from each other, surpassing the edge of the hole so as to prevent the tensioning member 2 from slipping out of the same support member. As before, also in this case the ring 90 is connected with the arms 92 by means of undercuts 94 that engage the contour of the holes 32 and 32A in the same way explained above.

In addition, said ends are connected to the respective arm by means of a curve 95 to engage with the edge of the holes of the support member in the same way as described above. It should be noted, as before, that the ring may be free from undercuts and/or arms free from curves, i.e., the general shape of the tensioning member 9 may even be a simple fork. Therefore, the engagements with the corresponding holes on the support member will be identical to those described above.

A further object of the invention is a system for the support of rows of plants, especially fruit plants and preferably grapevines, comprising the tensioning device 1 of the wires F described above.

In particular, the system I comprises (FIG. 1) a plurality of intermediate poles PI guiding and supporting a plurality of wires F supporting the vegetation. The system further comprises at least one end pole PE or head pole fixed to the ground by conventional means such as concrete bases. The end pole is generally braced by means of bracing wires FC fixed to the ground with conventional anchors. Alternatively, or in combination with, a pole mounted vertically may preferably be connected to the head pole by means of a first section (not shown) positioned at the upper ends of said head pole and the corresponding vertical pole, and possibly by means of a second section positioned at the lower ends of said poles embedded in the ground so as to form a rigid structure that withstands the tension of the wires of the row, in accordance with what is described in the patent EP2988589. Fixed wires FM (or carrying wires FF as defined in said patent and distinct from the containment wires instead referred to as FM) are fastened to the two end poles PE at a predetermined height and unchanged in order to support the fruiting cane of a plant. These wires are also kept at such height from the ground along the whole system through the use of conventional hooks (not shown) obtained on each intermediate pole PI. These hooks are also distributed along the pole so as to obtain different positions of the movable wires in the usual way to follow and support the development of the vegetation. Movable wires F3 are connected to at least one end of the end poles PE or, as shown in FIG. 1, to resilient compensating devices 100, which are in turn fastened to the end poles PE.

A further object of the invention is a method for supporting plants along rows, comprising the steps of:
  embedding two end poles PE braced with appropriate means into the ground at a predetermined distance;
  arranging in a straight line between said two end poles PE a plurality of intermediate poles PI comprising hooks for the reversible attachment of wires F to support the plants;
  fastening and tensioning at least one fixed wire FM supporting a fruiting cane of said plants to said two head poles and a plurality of movable wires F1-F4 on two sides of said head poles so as to cover the entire length of the row in parallel and delimiting a space of containment of the branches of the growing plants,
wherein said stage of fastening and tensioning the plurality of movable wires F1-F4 or fixed wires FM is carried out by means of tensioning devices 1 or resilient compensating devices 100 comprising said tensioning devices 1 as described above.

It was thus found that the device of the invention has achieved the task and the intended objects. In effect, the device is advantageously much simpler in construction than the known tensioning devices. It is also quick to install on a pole of a row of plants, said pole being able to have a cross-section of any shape and size.

One may appreciate how easy it is to operate the device as it does not require special and bulky tools, when again comparing it with the known devices described by way of example above.

A further advantage is that it may be easily applied on conventional supports without modifications, or after simple additional works of adaptation represented by the creation of a cam profile in holes already present on the supports.

It should be noted that its bulk is truly reduced so as, on the one hand, not to hinder the vegetation of the plants adjacent to the head pole of the row and, on the other hand, not to hinder the agricultural machines that work on the row.

Last but not least, a practically universal wire tensioning device has been provided, as it may adapt to any type of structure due to the arrangement of the fork tensioning member; therefore, any shape and size of support, whether a parallelepiped plate or a circular or polygonal tubular section, whether a closed or open hollow pole of any cross-section, or a solid pole or support penetrated by holes to accommodate the tensioning member and at least one fixing wire.

The embodiments of a resilient compensating device according to the present invention are certainly not limited to those shown in the accompanying drawings, but rather may consist of multiple embodiments, all falling within the scope of the accompanying claims. Moreover, the materials as well as the dimensions making up the individual components of the invention may be those most suitable according to specific requirements.

For example, the tensioning member may be applied to poles the walls of which, penetrated by the engagement holes of the same tensioning member, are provided with a longitudinal recess on which these holes are obtained. In this way, a sort of longitudinal passage is formed, penetrated by the holes of engagement of the member. Therefore, the retainer may advantageously consist of a substantially flat plate of such a width as to be inserted and accommodated to size in said passage and presenting a groove of engagement with the ring and the ends of the tensioning member. As a result, it is sufficient to simply fit the plate astride said ring or ends to create a simple and effective lock against the rotation of the tensioning member.

Moreover, since the plate is accommodated in the recess, advantageously there are no members protruding from the surface of the pole.

The shape of the tensioning member may vary according to specific needs or preferences. In effect, for example, the ring may be circular, elliptical, square, polygonal or other.

The shape of the holes in the support member of the tensioning member may also have different profiles, while maintaining a portion that allows them to accommodate the tensioning member for blocking the rotation thereof. Therefore, such portion may be cam-shaped, rather than sharp-edged or beveled.

The rod which comprises the tensioning member, once shaped in such a way as to have the aforesaid ring portion with undercuts, rectilinear arms, and the ends bent in such a way as to converge or diverge, must be substantially rigid, i.e. it must withstand the winding and traction stresses exerted by the wire or at most show a flexion at the section of the arms between the two opposing walls of the support member to allow the ends of the arms to cross, as explained above.

In addition, the tensioning device may be mounted on a resilient compensating device on the end thereof opposite to the fastening end of a pole, i.e. in place of the winding roller of the resilient compensating device described in patent EP1699286.

It should be noted that the tensioning member 9 may also be alternatively mounted on the support member 3.

The hole 32 engaging with the ring 20, 90 of the tensioning member 2, 9 may comprise a double cam or double recess profile, wherein said recesses are diametrically opposed to the longitudinal profile of the same hole, or there may be a plurality of recesses distributed along a circular contour.

The member 5 for fastening the resilient compensating member to the pole may consist of a portion for fastening to the pole with a slot or collar adapted to fit on the outer circumference of a pole, and a portion fastening to the support member of the tensioning device. In other words, the resilient member may be eliminated and the two opposing hooks of the second end of the member fastening to the pole may be directly fastened to said support member.

The means for retaining or blocking the rotation of the tensioning member may also consist of any member with a shape such as to block the rotation. For example, such a means may be a pin comprising a rectilinear engagement portion with the first bridge or ring portion of the tensioning member and a hook portion of engagement with an edge or a hole or opening of the support member.

The plate bent in a C as a means of blocking the tensioning member may have a groove made in one of the two opposing walls and a through-hole in the wall joining the two opposing walls. In this way, the hole on the joining wall will be penetrated by the wire to be tensioned, while the groove on one of the two opposite walls will engage in blocking the free ends or the first end of the fork of the tensioning member.

Moreover, the support member 3 may be released from the coils of the spring 6, i.e. it may be mounted between the fastening member 5 on the pole and the first coil of the spring 6. In this case, the holes 39 may be avoided and the second wall 31 acts as the surface against which the spring 6 works.

Furthermore, the support member may consist, as explained above, of a solid bar or rod wherein at least one through-hole has the geometry of the hole 32, with its respective recess 33, or of the hole 32A.

Alternatively, the support member may be an internally hollow bar or rod.

In addition, regardless of the circular, square or other ring shape of the first end 20, 90 of the tensioning member 2, 9, the corresponding second end 21, 91 may have the free ends 23, 93 diverging or converging.

The invention claimed is:

1. A wire tensioning device comprising:
   at least one wire tensioning member, formed as a bent metal fork having a first end as a bridge connected to a second end by two longitudinal arms, the second end having two free ends, and the at least one wire tensioning member being formed of a rod having a circular cross-section;
   a support member adapted to support the tensioning member in rotation, the support member having at least one through-hole; and
   blocking means to block the rotation of the tensioning member, the blocking means being a cam-shaped portion of the at least one through-hole, wherein
   the arms of the tensioning member penetrate the at least one through-hole so that the tensioning member rotates independently with respect to the support member to tension a wire, and the tensioning member reversibly engages with the cam-shaped portion,
   the support member and the blocking means are formed integrally,
   the arms extend from undercut portions positioned between the first end and the arms, the undercut portions extending in a direction toward each other, and the two free ends bending in a direction away from each other, and
   the cam-shaped portion is arranged to receive the undercut portions to block the rotation of the tensioning member.

2. The device according to claim 1, wherein:
   the first end of the tensioning member has an open circular shape, the two arms extending from the open circular shape at the undercut portion of the first end, and
   the two free ends are curved so as to engage with a second through-hole of the at least one through-hole of the support member.

3. The device according to claim 1, wherein the support member includes two first opposing walls that are parallel to one another and spaced apart to define an empty inner space, the two first opposing walls being kept spaced and parallel by a second wall that joins the two first opposing walls at a longitudinal edge of the two first opposing walls.

4. The device according to claim 3, wherein the at least one through-hole includes two through-holes, each of the two first opposing walls including one of the two through-holes, the through-holes being aligned with each other.

5. The device according to claim 1, wherein the support member is a pole for fastening fixed wires or movable wires.

6. A resilient compensating device for wires for supporting plant vegetation, the resilient compensating device comprising:
the wire tensioning device according to claim 1;
a member configured to fix the wire tensioning device to a head pole of a row; and
a resilient compensating member for the wires.

7. A system for the support of a row of plants, the system comprising:
a plurality of intermediate poles to guide and support a plurality of wires to support the plants;
two end poles;
fixed wires fastened to the two end poles at a predetermined height to support a fruiting cane of a plant, the fixed wires engaged to each intermediate pole by a plurality of hooks to maintain a fixed wire height from the ground along the entire system, the plurality of hooks on the intermediate poles also maintaining movable wire heights from the ground, the movable wires being attached to the head pole by the resilient compensating device according to claim 6.

8. A method for the support of plants along a row, comprising the steps of:
fixing two end poles braced in the ground at a predetermined distance;
arranging in a straight line between the two end poles a plurality of intermediate poles including a plurality of hooks for reversible attachment of wires to support the plants;
fixing and tensioning at least one fixed wire supporting a fruiting cane of the plants to the two head poles; and
fixing and tensioning a plurality of movable wires to at least two sides of the head poles, the plurality of movable wires spanning an entire length of a row in parallel and delimiting a space of containment of branches of the plants,
wherein the fastening and tensioning of the plurality of movable wires or fixed wires is carried out by the tensioning device according to claim 1.

* * * * *